US012704160B2

(12) United States Patent
Grillon et al.

(10) Patent No.: US 12,704,160 B2
(45) Date of Patent: Aug. 11, 2026

(54) HYDRAULIC MACHINE COMPRISING A STACK OF DISCS ACTED ON BY A PUSH ROD

(71) Applicant: POCLAIN HYDRAULICS INDUSTRIE, Verberie (FR)

(72) Inventors: Gilles Grillon, Verberie (FR); Julien Engrand, Verberie (FR); Jérémy Gérard Respecte, Verberie (FR); Dominique Costaz, Verberie (FR); Loïc Bonnard, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 661 days.

(21) Appl. No.: 17/911,849

(22) PCT Filed: Mar. 24, 2021

(86) PCT No.: PCT/FR2021/050508
§ 371 (c)(1),
(2) Date: Sep. 15, 2022

(87) PCT Pub. No.: WO2021/191562
PCT Pub. Date: Sep. 30, 2021

(65) Prior Publication Data

US 2023/0147694 A1 May 11, 2023

(30) Foreign Application Priority Data

Mar. 27, 2020 (FR) ....................................... 2003031

(51) Int. Cl.
*F16D 55/24* (2006.01)
*B60T 1/06* (2006.01)
(Continued)

(52) U.S. Cl.
CPC .............. *F16D 55/40* (2013.01); *B60T 1/065* (2013.01); *B60T 13/22* (2013.01)

(58) Field of Classification Search
CPC .... F16D 65/186; F16D 2125/06; F16D 55/50; B60T 13/22; B60T 1/065
See application file for complete search history.

(56) References Cited

U.S. PATENT DOCUMENTS 3,653,472 A * 4/1972 Dowell .................. F16D 55/40 188/72.4
4,057,297 A * 11/1977 Beck ...................... F16D 59/02 188/170

(Continued)

FOREIGN PATENT DOCUMENTS

EP 1154170 A1 11/2001
EP 1072814 B1 4/2006

(Continued)

OTHER PUBLICATIONS

Search Report in co-pending, related PCT Application No. PCT/FR2021/050508, mailed Aug. 16, 2021.

(Continued)

*Primary Examiner* — Nicholas J Lane
(74) *Attorney, Agent, or Firm* — Thomas | Horstemeyer, LLP

(57) ABSTRACT

The hydraulic machine comprises: —a fixed part, —a part mounted so as to rotate about an axis (O-O) with respect to the fixed part, —a stack (50) of discs (53, 54) forming a brake or clutch, the discs being able to be in abutment against one another by way of friction surfaces (88) having a mean friction radius (Rf) with respect to the axis, —a push rod (80) that is able to push the discs into abutment against one another, in a direction parallel to the axis, over a thrust surface (4), the thrust surface having a mean thrust radius (Rp) with respect to the axis which extends to within or (Continued)

beyond the mean friction radius (Rf). The push rod (80) has a radial annular notch (90) indenting the push rod from an opposite side of the push rod from the axis (O-O) when the mean thrust radius (Rp) extends beyond the mean friction radius (Rf), and otherwise from the side of the push rod closest to the axis.

15 Claims, 6 Drawing Sheets

(51) Int. Cl.
*B60T 13/22* (2006.01)
*F16D 55/40* (2006.01)

(56) References Cited

U.S. PATENT DOCUMENTS 6,345,968 B1* 2/2002 Shupe .................... G08B 5/38 418/104
2007/0258840 A1* 11/2007 White ................ F04C 15/0084 418/61.3
2008/0028923 A1* 2/2008 Fujita .................... F16D 25/12 91/375 R
2011/0253488 A1* 10/2011 Vidal .................. F16D 65/186 188/67
2013/0081910 A1* 4/2013 Chelaidite .............. F16D 55/10 188/73.31
2014/0041970 A1* 2/2014 Burgoon ................ F16D 65/18 188/72.4
2018/0017117 A1* 1/2018 Engrand .............. F16D 65/853
2018/0259005 A1* 9/2018 Nikola .................. F16D 13/68
2022/0170460 A1* 6/2022 O Hara ................. F04C 9/002
2023/0287944 A1* 9/2023 Shahin .................. F16D 65/18

FOREIGN PATENT DOCUMENTS

EP 3269994 B1 9/2019
GB 2314601 B 12/2000

OTHER PUBLICATIONS

Search Report in co-pending, related French Application No. FR 2003031, mailed Oct. 7, 2020.
Chinese Office Action in related Chinese Application No. 202180038316.8, mailed May 23, 2025 (with English Translation).

* cited by examiner

HYDRAULIC MACHINE COMPRISING A STACK OF DISCS ACTED ON BY A PUSH ROD

CROSS REFERENCE TO RELATED APPLICATIONS

This application is the 35 U.S.C. § 371 national stage application of PCT Application No. PCT/FR2021/050508, filed Mar. 24, 2021, which application claims the benefit of French Application No. FR 2003031 filed Mar. 27, 2020, both of which are hereby incorporated by reference herein in their entireties.

FIELD OF THE INVENTION

The invention relates to hydraulic machines, in particular, but not exclusively hydraulic machines with radial pistons.

PRIOR ART

Numerous types of hydraulic machines have already been proposed. One embodiment of a machine of this type will be found reproduced in FIGS. 1 and 2. It comprises essentially five assemblies: a housing 10, a shaft 20, an assembly 30 forming a motor or a pump located between the housing and the shaft, bearings or rolling element bearings 42, 43 for guiding the shaft in rotation with respect to the housing, and a brake 49.

The housing 10 is intended to be attached to the chassis of a machine or of a vehicle. It comprises a cam 12 with multiple lobes sandwiched between two side elements of the housing.

The shaft 20 supports a power take-off 28 suitable for carrying an accessory which must be driven in rotation, for example the rim of a wheel or any other machinery, in the case where the machine constitutes a motor and delivers a driving torque to the accessory. In the case where it constitutes a pump, the power take-off receives a driving mechanical motor torque applied to the inlet of the machine.

The assembly 30 forming a motor or a pump has radial pistons. It comprises a distributor 32, a cylinder block 34 which includes a plurality of radial cylinders 35 each housing a piston 36 each carrying a roller 38 in abutment against the cam 12 integral with the housing. When the distributor 32 applies cyclically a fluid under pressure inside the cylinders 35, the force acting on the pistons 36 and the associated rollers 38 on the cam 12 drives the cylinder block 34 in rotation with respect to the cam and consequently with respect to the housing 10.

The cylinder block 43 being linked in rotation with the central element 22 of the shaft, in this case the shaft is driven in rotation by the pressure of the fluid applied by the distributor. The hydraulic machine then constitutes a motor.

When, on the contrary, a mechanical force is applied by the power take-off on the shaft 20 in the direction of driving in rotation with respect to the housing 10, the movement of the rollers and of the pistons with respect to the lobes of the cam induces a variation of the volume of the cylinders and consequently applies a fluid pressure on the distributor. The machine then functions as a pump.

This machine is reversible, and therefore operates equally as a pump or motor, and can also turn in both directions of rotation. A hydraulic machine of this type can therefore be found in four different situations, which define the four value quadrants of pressure and direction of flow: forward motion, in traction or holding, and rearward motion, in traction or holding.

The brake 49 is formed from a stack of disks linked alternatively in rotation, some to the shaft and the others to the housing. The disks are acted upon in mutual abutment, hence in the braking position, by an elastic element 56 such as a Belleville washer.

This member 56 is arranged between, on the one hand, an element of the housing, and on the other hand a longitudinal piston 51 which is in abutment on the stack of disks. A force opposing the elastic member can be applied in a control chamber 58, placed between the stack of disks and the piston, in order to place the brake in a de-braking position.

Considered here necessarily are explanations which follow the rubbing surface, or friction surface, of the disks. This is the surface of the disks by which they are in mutual contact and which generates a friction producing braking. It must therefore be distinguished from the surface of the disks not providing this friction. Also considered is the thrust surface, which is the surface of the longitudinal piston 51 and of the first disk of the stack by which these two members are in mutual contact for the transmission of the thrust force.

In many machines, the friction surface and the thrust surface do not coincide when they are considered in the respective planes perpendicular to the axis. In other words, they are not locally centered with respect to one another (although the longitudinal piston and the disks are coaxial). This is for example a situation in which the friction surface is offset in the radial direction opposite to the shaft with respect to the thrust surface. In certain cases, it is the opposite that is observed. In other words, this is a situation in which the respective radial positions of the friction surface and of the thrust surface do not coincide, the friction surface being able to be located radially higher than the thrust surface and vice versa.

In both cases, it signifies that the thrust of the piston is not exerted in the alignment of the largest part of the friction surface or is not suitably centered with respect the latter locally. It follows that the thrust is not transmitted optimally to the disks, resulting a heterogeneous contact pressure in the friction surfaces. It follows that the thrust is poorly distributed in the disks, and in particular is too high in certain places. The possible result is a tendency for the appearance of an over-torque or a seizure. The over-torque is defined as the temporary provision of an additional torque, the intensity of which cannot be predicted. Considerable torque differences can then occur on two brakes mounted on the same axle for example, resulting in instability of the machine during braking. It is also possible to see vibrations appear. Compensating for it leads to over-dimensioning the set of components through which the braking torque passes. For example, the disks forming the brake would need to be thicker in order to allow the passage of this additional torque in the splined connections of these disks with their respective opposing parts. But these two situations are to be avoided. By way of an example, brakes with nitrided disks are particular subject to over-torque.

One object of the invention is to avoid the over-dimensioning of the components of the transmission chain of the braking torque (in particular, to avoid increasing the thickness of the disks, their diameter and the number of their splines) and reducing the risks of occurrence of an over-torque or a seizure of the machine.

DISCLOSURE OF THE INVENTION

To this end, a hydraulic machine is provided comprising:—a fixed part, —a part rotatably mounted about an axis with respect to the fixed part, —a stack of disks forming a brake or a clutch, the disks being able to be in abutment against one another by way of friction surfaces having a mean friction radius measured from the axis, —a push rod able to push the disks into abutment against one another, in a direction parallel to the axis, over a thrust surface having a mean thrust radius measured from the axis and which extends within or beyond the mean friction radius, the push rod having a radial annular notch indenting the push rod from a side of the push rod opposite to the axis when the mean thrust radius extends beyond the mean friction radius, and otherwise from a side of the push rod closest to the axis.

In other words, the notch is located on the side of the gap between the place where the thrust is exerted and the line of the mean radius of the friction surface of the disks. Thus, in the presence of an offset between the friction surfaces and the thrust surface, the notch allows the push rod to bend in order to re-center the thrust force on the friction surfaces. Consequently, the thrust force is exerted more perpendicularly to the friction surfaces. For example, if the pressure is too great on the side closest to the outside of the stack of disks, the presence of the notch allows relieving this part. The pressure is thus distributed more homogeneously. The absence of a strong contact pressure thus avoids the appearance of a lubrication regime called "dry," a regime in which the over-torque appears. Braking is better and more regular. Moreover, it is no longer necessary to over-dimension the transmission components of the braking torque chain. In summary, the invention allows better distribution of the thrust force on the stack of disks in order to avoid the phenomena of seizure and over-torque. In addition, this solution implements a single part, and not several parts movable with respect to one another, to simplify assembly and manufacture, in particular to reduce the risk of forgetting a part during the assembly of the machine.

It is possible to observe that the notch extends in a part of the push rod which transmits thrust to the disks.

It is possible to provide that the bottom of the notch extends adjacent to the thrust surface. In other words, a radius of the notch at the bottom of the notch is comprised between a smaller radius of the thrust surface and a larger radius of the thrust surface.

It is possible to provide that the bottom of the notch extends adjacent to the friction surfaces. In other words, a radius of the notch at the bottom of the notch is comprised between a smaller radius of the friction surfaces and a larger radius of the friction surfaces.

It is possible to provide that the machine is configured so that a member exerts a braking force on the push rod over a reception zone having a mean radius of reception measured from the axis, and which extends beyond the mean thrust radius when the mean thrust radius extends beyond the mean friction radius, and within it otherwise.

It is possible to provide that the reception zone has a smaller radius which extends beyond a larger radius of the thrust surface or of the friction surface when the means thrust radius extends beyond the mean friction radius, and within it otherwise.

It is possible to provide that the reception zone has a smaller radius which extends beyond a smaller radius of the notch when the mean thrust radius extends beyond the mean friction radius, and within it otherwise.

It is possible to provide that the push rod has a greater radius than a larger radius of the friction surfaces.

In this configuration, the push rod has a dimension with exceeds the friction surfaces of the stack of disks in the axial view of the machine. The push rod has a radius located outside the friction surface.

Preferably, the notch is dimensioned so that the mean friction radius is comprised between a larger radius of the notch and a smaller radius of the notch.

Thus the notch extends until the perpendicular to the mean radius of the friction surfaces.

It is possible to provide that a larger radius of the friction surfaces is greater than the smaller radius of the notch or that a smaller radius of the friction surfaces is less than the larger radius of the notch.

It is possible to provide that the machine is arranged so that at least one part of the push rod bends increasingly as thrust of the push rod against the stack increases.

Thus, this bending allows reducing the contact pressure in the zone of the thrust surface that is not suitable centered with respect to the friction surface. This part of the push rod can be the closest to the stack or that which is farthest away from it.

In one embodiment, a part of the push rod has an axial dimension which decreases in the direction of a free end of this part.

This configuration allows controlling the deformation of this deformable part of the push rod and therefore controlling the distribution of the contact pressure. This part of the push rod can be the closest to the stack or that which is farthest away from it.

It is possible to provide that, the notch having two main faces facing one another, one of these faces is inclined oriented in the direction of the exterior of the push rod.

This inclined face favors the bending of the push rod. Moreover, by simplifying access to the bottom of the notch it facilitates its machining if needed.

Advantageously the inclined face extends from one side of the notch closest to the stack.

This arrangement constitutes a means of producing the deformable part of the push rod while still controlling the deformation and the evolution of the contact pressure.

It is possible to provide that the push rod has a push rod guide face in the axial direction with respect to a support.

Preferably, the guide face extends entirely from one side of the notch farthest away from the stack.

Thus there is no interference within the push rod between the zone assigned to be deformed when thrusting and that serving as a guide.

It is possible to provide that the machine comprises a calibrated spring capable of pushing the push rod against the stack.

What is meant by that is that the spring supplies a constant braking load in the absence of other loading. It is then possible to dimension the notch depending on this intensity to obtain the desired distribution of stress. Thus, if desired, it is possible to dimension the bending of the part.

The machine can further have any one at least of the following features:

- it comprises a spring able to push the push rod against the stack and a de-braking chamber arranged so that hydraulic pressure in the chamber applies a force opposing braking to the spring;
- the stack is in an oil bath;
- the disks are made of nitrided steel;
- the disks comprise a lining of a friction material;
- the lining has grooves; and the stack forms a brake or a clutch.

The grooves can thus serve to pass oil, if necessary.

It is possible to provide that the brake, if necessary, provides at least one of the functions of a motor, of an emergency brake, of a safety brake (so that, in the event of a breakdown of the machine, the brake immobilizes it) and of a parking brake.

DESCRIPTION OF THE FIGURES

We will now present an embodiment of the invention by way of a non-limiting example, with reference to the drawings in which.

Figure 1:
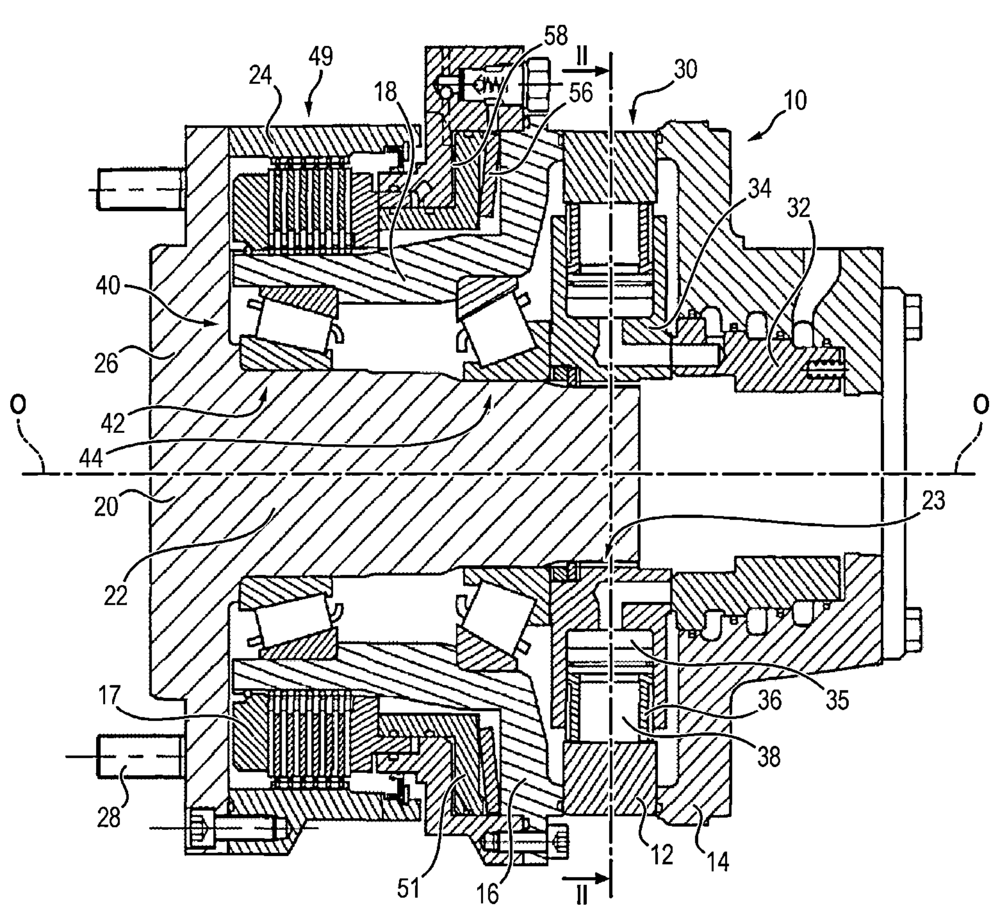
FIG. 1 is an axial section view of a machine according to the prior art.
Figure 2:
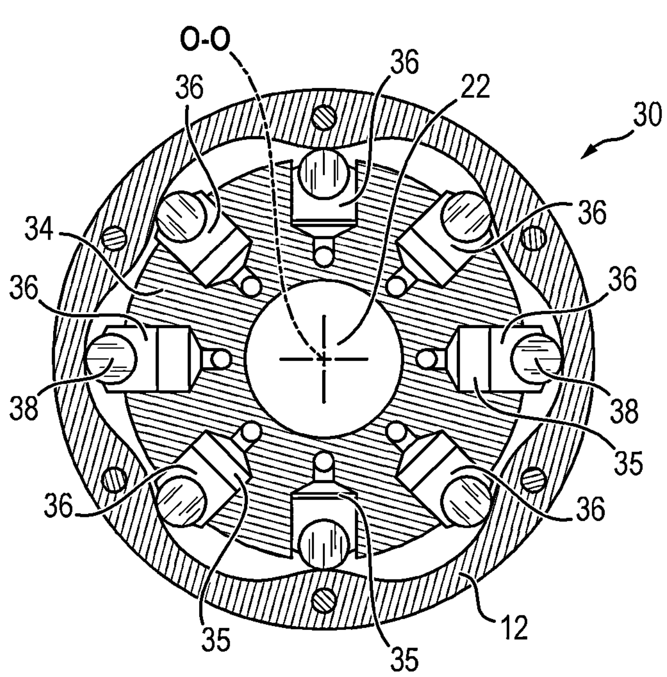
FIG. 2 is a transverse section view of the machine along the plane II-II of FIG. 1.
Figure 3:
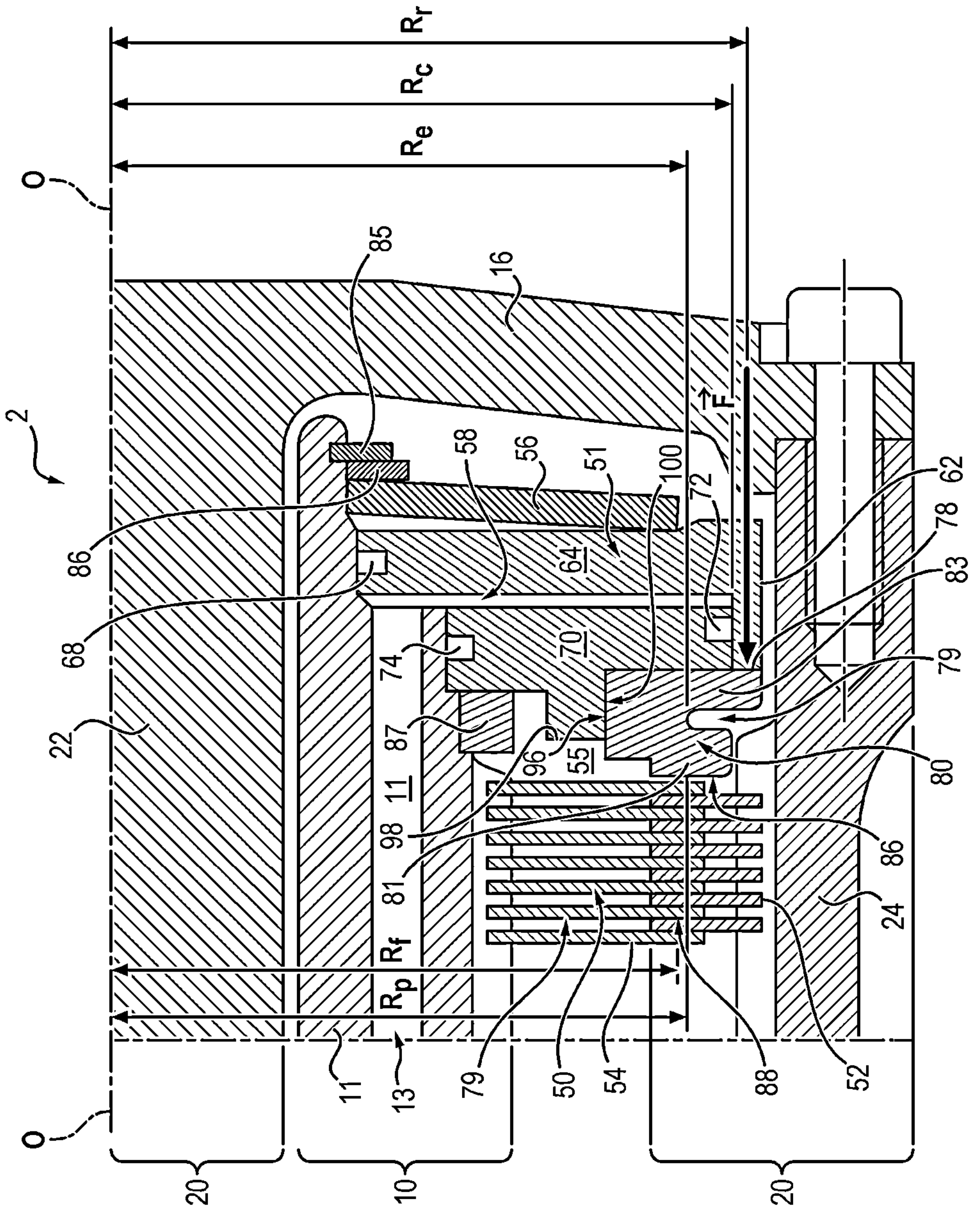
FIG. 3 is a view of a machine according to one embodiment of the invention.
Figures 4, 5:
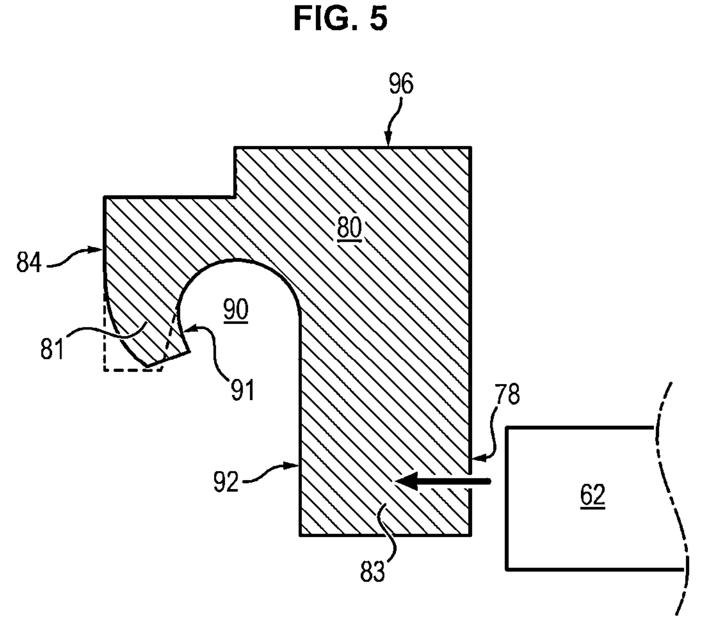
FIGS. 4 and 5 are different schematics in axial view showing mainly the push rod of the machine of FIG. 3 and illustrating the characteristics of the latter.

Just like the machine of FIGS. 1 and 2, the hydraulic machine 2 according to the present embodiment of the machine, illustrated in FIGS. 3 and 4, is centered on an axis O-O, and comprises essentially five complementary assemblies: a housing 10, a shaft 20, an assembly forming a motor or a pump, not illustrated and positioned between the housing 10 and the shaft 20, non-illustrated means forming bearings for guiding in relative rotation the shaft 20 with respect to the housing 10, and a brake 49.

The housing 10 is intended to be attached to the chassis of a machine or of a vehicle. It comprises a cam with multiple lobes, not illustrated, and sandwiched between two side elements of the housing.

The shaft 20 supports a power take-off suitable for carrying an accessory which must be driven in rotation, for example the rim of a wheel or any other machinery, in the case where the machine constitutes a motor. In the case where it constitutes a pump, the power take-off receives a mechanical motor torque applied to the inlet of the machine.

The assembly forming a motor or a pump has radial pistons. It essentially comprises a distributor and a cylinder block which includes radial cylinders housing the respective pistons and each carrying a roller in abutment against the cam integral with the housing. The number of cylinders and therefore of pistons of the cylinder block differs from the number of lobes of the cam. As in the machine of FIGS. 1 and 2, the cam is radially external and the cylinder block, located radially inside the cam, has its cylinders which open radially outward, facing the cam. The distributor is supplied via an element which forms a cover and connector for feeding the distributor.

In a manner known per se, when the distributor cyclically applies a fluid under pressure inside the cylinders, the loading of the pistons and of the associated rollers on the cam drives the cylinder block in rotation with respect to the cam and consequently with respect to the housing. The cylinder block being linked in rotation with the central element of the shaft 20 by a system of longitudinal splines, the shaft is driven in rotation by the pressure of the fluid. In this case, the machine constitutes a motor. When, on the contrary, a mechanical force is applied by the power take-off on the shaft 20 in the direction of driving in rotation with respect to the housing 10, the movement of the rollers and of the pistons with respect to the lobes of the cam induces a variation of volume of the cylinders and consequently applies a fluid pressure to the distributor. The machine then functions as pump. This machine is thus reversible, and therefore functions equally as a pump or as a motor, and can also turn in two directions of rotation.

To limit the axial bulk of the machine, the power take-off can be provided on the outside of a radially external element as is the case with FIG. 3. According to a variant embodiment, the power take-off is placed axially on a disk transverse to the axis O-O, as was the case in FIG. 1.

Indicated in FIG. 3 is the fixed part associated with the housing 10 and the rotating part comprising the shaft 20. The means forming bearings, not illustrated, comprise two rolling element bearings with rollers interleaved between the shaft 20 and the housing 10.

The shaft 20 has a central zone or hub 22 intercepted by the axis O-O and a cylindrical extension 24 remote from the axis, forming a ring gear and connected to the central zone by a connecting disk 16.

The housing 10 has a cylindrical axial extension 11.

The brake 49 is of the disk brake type. It is formed from a stack of disks 52, 54 connected alternatively in rotation, some to the shaft 20 and the others to the housing 10. The disks are therefore connected to the fixed part 10 and to the rotating part 20 with a spatial alternation along the longitudinal axis O-O.

Each of the disks 52, 54 is formed by a washer. Their connection in rotation to the housing and to the shaft respectively can be formed for example by the engagement of ribs provided in the radially outer or alternatively radially inner periphery of the disks 52, 54 into the complementary splines or grooves formed facing them on the ring gear 24 of the shaft and the extension 11 of the housing respectively associated. As a variant, it is possible to provide an intermediate part for connection in rotation interleaved between the disks 52 or 54 and one of the housing 10 or the shaft 20.

The machine has a brake chamber 55 placed opposite to the cylinder block in the axial direction with respect to the stack of disks. It is thus situated in FIG. 3 to the right of this stack. In this case, the brake 49 is arranged at the axial end of the machine adjacent to the power take-off, i.e. near the power take-off, opposite to the distributor with respect to the cylinder block.

Qualified here as “proximal” is the part of a brake part 49 oriented toward the assembly forming a motor or a pump, hence to the left in FIG. 3, and “distal” its part oriented opposite, remotely from this assembly, toward the outside of the machine, to the right in the figure.

Moreover, the brake chamber 55, just like the axial extension 11 of the housing 10, are in this case interleaved in the radial direction between the central zone 22 and the ring gear 24 of the shaft 20.

The stack 50 of disks is again placed here between two axial abutments. One is similar to the abutment 17 of FIG. 1 and is not illustrated in FIG. 3. The other is the push rod 80 which will be described below. The alternating disks are acted on in mutual abutment, hence in the braking position, by an elastic element 56, for example of the Belleville washer type. The Belleville washer has its concavity directed toward the stack 50 in this case. It abuts a longitudinal annular piston 51 acting on the stack 50 during braking, preferably at its radially outer periphery according to the embodiment illustrated.

With the spring 56 are associated, on the side of the spring opposite to the piston in the axial direction, a stop ring 85 housed in an annular recess of the extension 11 and a wedge 89 interleaved between them in the axial direction. The ring and the wedge ensure the axial blockage of the edge of the spring closest to the axis O-O.

A force opposing the elastic member 56 can be applied in a control or de-braking chamber 58, located between the stack of disks 50 and the longitudinal piston 51, in order to place the brake 49 in the de-braking position. The piston 51, which defines the de-braking chamber 58, is movable by sliding along the axis O-O relative to the housing 10.

It comprises a part forming a cylindrical sheath 62 interleaved in the axial direction between the stack of disks 50 and the spring 56. The sheath 62 is extended by a part in the form of a washer 64 transverse to the axis O-O, associated with a gasket 68 with respect to the extension 11 to constitute a wall of the de-braking chamber 58. The sheath 62 serves, at its proximal end, as a loading element in abutment with the stack of disks 52, 54. The parts 62 and 64 are assembled to one another in a rigid and sealed manner, for example by screwing and by incorporating a static sealing means such as a seal, or are of a single block as illustrated. The piston 51 thus has an "L" shaped half-section, having a branch 64 transverse to the axis and a longitudinal branch parallel to this axis, which corresponds to the sheath 62. The piston 51 is thus able to apply to the spring 56 a force opposing braking, when a pressure is applied in the de-braking chamber 58 to expand it. Other modalities of positioning and of cooperation between the piston 51 and the spring 56 are possible.

The machine comprises a ring 70, transverse to the axis O-O, placed between the stack of disks 50 and the washer 64 of the piston. The ring 70 forms one of the transverse walls of the de-braking chamber 58. It is housed in the radial direction between the sheath 62 and the extension 11 facing it and has a clearance for sliding with respect to the piston 51, i.e. a radial dimension less than the radial gap existing between these parts, to allow at least a slight axial relative movement between the ring 70 and the piston 51. The ring 70 is associated with two seals 72, 74 which cooperate respectively with the piston 51 and the housing element 11. The sheath part 62 is able to slide relative to the ring 70.

The de-braking chamber 58 thus has an annular shape and is delimited in the axial direction by the piston washer 64 and the ring 70 and radially by the sheath 62 and the extension 11.

The de-braking chamber 58 is closed by the three seals 68, 72 and 74.

The seal 68 associated with the piston 51 is of the type called "joint D ring" complying with standard DIN 11850 comprising a semicircular face and a flat face. It is housed in a groove of complementary width, formed preferably in the washer 64, or as a variant in the element 11 of the housing placed facing the latter. The flat face of the seal 68 is placed in the bottom of the groove. Its semicircular face rests against the facing element capable of relative translation along the axis O-O.

The seal 72 providing the seal between the ring 70 and the piston 51 is of the same type, in this case.

The seal 74 providing the seal between the ring 70 and the housing 10 element 11 placed facing it is preferably an O ring seal, or a "D-ring" D-shaped ring. When it is placed on the washer 70 as illustrated, the use of a D-ring allows good handling of the seal during assembly.

The de-braking chamber 58 is supplied by means of at least on channel 13, at least partly longitudinal, formed in the extension 11 of the housing to open into the chamber 58. Without this being limiting, the channel 13 can for example open at a step formed on the periphery of the longitudinal extension 11 as illustrated in FIG. 3. The channel 13 is connected to a de-braking control line of the hydraulic machine.

The push rod 80 is interleaved in the axial direction between the stack of disks 50 and the ring 70.

The machine therefore comprises here, in the axial longitudinal direction, from the proximal toward the distal, in particular:

- the stack of disks 50,
- the push rod 80 in direct axial abutment on the first disk of the stack,
- the ring 70 in direct axial abutment on the push rod 80,
- the sheath 62, itself also in direction axial abutment on the push rod 80 around the ring 70,
- the de-braking chamber 58,
- the washer 64 of the piston 51,
- the spring 56,
- the wedge 89, and
- the stop ring 85.

A wedge 87 is interleaved in the axial direction between a shoulder of the extension 11 of the housing and the portion of the ring 70 closest to the axis.

At rest, the spring 56 acts on the sheath 62 and the push rod 80 in axial abutment on the stack of disks 52, 54 and thus acts on the disks in mutual abutment against one another. The brake 49 is then in the braking position. The shaft 20 is rigidly immobilized with respect to the housing 10.

On the other hand, it is assumed that a fluid pressure is applied in the de-braking chamber 58 and generates an axial force opposing the spring 56 and greater than the braking force generated by the latter. Because the axial abutment 87 limits the movements of the ring 70, the increase in volume of the de-braking chamber leads to a movement of the piston 51 in the direction of the spring 56 and therefore to a reduction in free space for the latter, between the piston 51 and the wedge 89, and therefore nullifies the force exerted in the braking position by the spring 56 on the stack of disks 52, 54. The latter no longer being acted upon in mutual abutment, the brake 49 is placed in the de-braking position. The shaft can rotate with respect to the housing.

Before describing the detail of the push rod 80, it is important to highlight that the general organization of the machine which has been presented is given by way of an example, and that very many other configurations are possible. This configuration of the machine and its different features are therefore not linked to the invention. They only belong to the present embodiment. For example, the invention is compatible with the general configuration of the prior art machine of FIGS. 1 and 2.

With reference in particular to FIGS. 3 and 4, the wedge 80 has a generally annular shape. It has a flat front annular proximal face 82 perpendicular to the axis O-O and able to come into axial contact with the first disk 54 of the stack. Distinguished on this face on the one hand is an annular thrust zone 84 able to come effectively into contact with this disk and an inert or inactive zone 86 which is not in contact with this disk when the thrust zone is. The thrust zone 84 is found facing the disk, unlike the inert zone 86.

The thrust zone 84 has a mean radius $R_p$ measured with respect to the axis. This mean is calculated for example as the arithmetic mean do the extreme radii of the thrust zone, namely the smallest $R_m$, and the largest $R_1$. Other means of calculation are possible, for example by taking into account the integral of the radii of the thrust zone.

The disks 52, 54 are able to be in abutment against one another by means of friction surfaces. Thus, in the same manner, an annular friction zone 88 can be distinguished on each disk which is able to come effectively into contact with the contiguous disk in the braking position and an inert or inactive zone 79 which is not in contact with this disk in the braking position. The friction zone 88 is located facing the contiguous disk unlike the inert zone 79.

The friction zone 88 has a mean radius $R_f$ with reference to the axis. Here too, the mean is calculated for example as the arithmetic mean of the extreme radii of the friction zone, namely the smallest $R_2$ and the largest $R_1$. Other modes of calculation are possible, for example by taking into account the integral of the radii of the zone.

The disks 52 in direct engagement with the ring gear 24 are identical with one another. Likewise, the disks 54 in direct engagement with the housing 10 are identical with one another. Because the friction zones 88 of all the disks coincide in the axial direction, the mean radius $R_f$ is the same throughout the stack.

In the configuration illustrated in FIG. 3, the mean thrust radius $R_p$ extends beyond the mean friction radius $R_f$. In other words, the mean thrust radius is greater than the mean friction radius. This signifies that the thrust zone 84 of the push rod 80 is offset with respect to the friction zones 88 in the radial direction opposite to the axis O-O.

It is also possible to observe here that the push rod 80 has a larger radius $R_M$, measured at its rear face in contact with the sheath and at its outer cylindrical face, greater than the larger radius $R_1$ of the friction surfaces 88. But even the front face 82 of the push rod has here a greater radius $R_a$ greater than the larger radius $R_1$ of the friction surfaces 88. It further has a smaller radius $R_m$, greater than the smaller radius $R_2$ of the friction surfaces 88.

The push rod 80 has an annular radial notch 90 indenting the push rod from a circumferential side of the push rod opposite to the axis O-O considering that the mean thrust radius $R_p$ extends here beyond the mean friction radius $R_f$. This notch has a generally annular shape and generally extends along a plane perpendicular to the axis. The notch 90 extends in a part of the push rod which transmits a thrust to the disks.

Here the notch has a "U" shaped profile in the circumferential direction and has two main faces 91, 92 facing one another. The rear face 92 is flat and perpendicular to the axis.

The notch extends for example over more than half of the total thickness of the push rod measured in the radial direction. But is can also extend over two-thirds, even three-quarters of this dimension and take on any value comprised between these limits, including the limits.

The notch 90 is dimensioned in this case so that the mean friction radius $R_f$ is comprised between a larger radius $R_a$ of the notch and a smaller radius $R_e$ of the notch. The bottom of the notch thus extends here until the end of the mean friction radius $R_f$, and a little beyond it in the radial direction moving toward the axis.

Thus the notch 90 delimits a front portion 81 of the push rod 80 which can come into contact with the stack 50 and a rear portion 83 which cannot come into contact with the stack and may come into contact with the ring 70 in the present configuration.

The bottom of the notch 90 extends adjacent to the thrust zone 84 with reference to the axis. In other words, the radius $R_e$ of the notch at the bottom of the notch is comprised between the smaller radius $R_m$, of the thrust zone 84 and the larger radius $R_1$ of the thrust zone.

The bottom of the notch extends adjacent to the friction surfaces 88. In other words, the radius $R_e$ of the notch at the bottom of the notch is comprised between the smaller radius $R_2$ of the friction surfaces 88 and the larger radius $R_1$ of the friction surfaces. In particular, the larger radius $R_1$ of the friction surfaces 88 is greater than the smaller radius of the notch.

The radius $R_M$ of the rear part 83 is in this case larger than that $R_a$ of its front part 81. Here in particular, the sheath 62 exerts an axial pressure in the portion of the rear part 83 which has the larger radius and which has no facing portion in the push rod at the front part 81.

The machine is configured so that the sheath 62 exerts a braking force on the push rod 80 over a reception zone 78 of the push rod having a mean reception radius $R_r$, shown in FIG. 3 and measured from the axis. This radius is greater than the mean thrust radius $R_p$ when the latter extends beyond the mean friction radius $R_f$, as is the case here.

In this case, the reception zone 78 has a smaller radius $R_c$ which is greater than a larger radius $R_1$ of the thrust surface or the friction surface. This smaller radius $R_c$ is also greater than the smaller radius $R_e$ of the notch measured at the bottom of the latter.

Like most parts, the push rod 80 is made of metal. The notch 90 confers upon it the possibility of bending in order to approach the free end of the front part 81 in the direction of the rear part 83 and/or approach the free end of the rear part in the direction of the front part. This bending occurs when the push rod is in abutment against the stack 50 in the braking position. This bending has been shown in a very exaggerated manner in FIG. 5 in solid lines, in comparison with the non-bent configuration illustrated in dotted lines. This figure illustrates by way of an example the case in which it is the free end of the front part 81 which approaches the rear part 83, it being understood that the reverse is also possible, as well as the combination of the two movements.

In the example of bending illustrated in FIG. 5, when the bending occurs, it is the portion of the front part 81 closest to its free end which bends first and more than the rest of this front part. This bending allows reducing the contact pressure on a part of the contact surface. It also allows distributing the contact pressure in a determined manner. The thrust surface 84 against the stack of disks 50 therefore tends to be reduced to bring it to its portion closest to the axis O-O. And especially the thrust exerted by the push rod 80 on the stack tends to be concentrated on the part of the thrust surface 84 closest to the axis in order to coincide more with the friction surfaces 88. This distribution of loads therefore compensates the difference between the mean thrust $R_p$ and friction $R_f$ radii.

This bending illustrated the influence of the notch 90 which, producing a weakening of the push rod 80, tends to bring back the eccentric force on RM around the radius $R_e$. A diffusion of the force then occurs, concentrated at $R_e$, toward the surface 84. This diffusion is a function of the thickness of the front part 81, denoted e. This thickness, correctly determined, ensures a diffusion of the pressing force F in the most homogeneous possible manner.

Ideally, the contact surfaces 82 and 88 are congruent. In other words, $R_m=R_2$; $R_a=R_1$ and therefore $R_f=R_p$.

The push rod 80 has a guide face 96 for sliding the push rod in the axial direction with respect to a support, formed here by a shoulder 98 of the ring 70. To this end, the latter has a cylindrical face 100 accomplishing a surface contact with the face 96. The guide face 96 ensures centering of the push rod in the machine.

As illustrated in FIG. 4, the guide face 96 extends entirely from one side of the notch 90 farthest away from the stack, namely on the rear distal part 83. Thus any risk of interference with the guide function during the thrust and the bending is avoided in the braking situation. In FIGS. 3 and 5, the push rod is illustrated without presenting this feature.

It will be observed that the contact pressure is transmitted from the piston 51 to the stack solely by means of the push rod 80, the latter constituting a rigid assembly which can be formed as a single part.

By way of a variant, in the contrary situation, the thrust surface 84 has a means thrust radius $R_p$ with respect to the axis which extends within the mean friction radius $R_f$. In other words, the mean thrust radius is less than the mean friction radius. This signifies that the thrust zone of the push rod 80 is offset with respect to the friction zone 88 in the direction of the axis.

Moreover, and independently of this aspect, it is seen in FIG. 4 that one 91 of the main faces of the notch 90 is inclined to be oriented in the direction of the exterior of the push rod. Here this is the front proximal face, therefore located on the side of the stack 50, on the part 81. This inclination facilitates the access to the bottom of the notch during the production of the latter, particularly by machining.

As regards the face which extends on the side of the notch closest to the stack and because the thrust face 84 is flat, it follows that the proximal part 81 of the push rod, closest to the stack, has an axial dimension e which decreases in the direction of a free end of this portion. This dimension has been illustrated in particular in FIG. 4, in an exaggerated manner. Due to this arrangement, in this example the part 81 bends increasingly as the pressure of the push rod against the stack increases. This arrangement therefore allows good control of the amplitude of bending as a function of the thrust force.

But a similar shape could be given to the other part 83 of the push rod to obtain the same property on this other part, in combination with this configuration of the proximate part 81, or not.

The push rod 80 which forms a wedge therefore has an optimized shape for diffusion and distribution of the contact pressure into the stack of disks.

Figure 6:
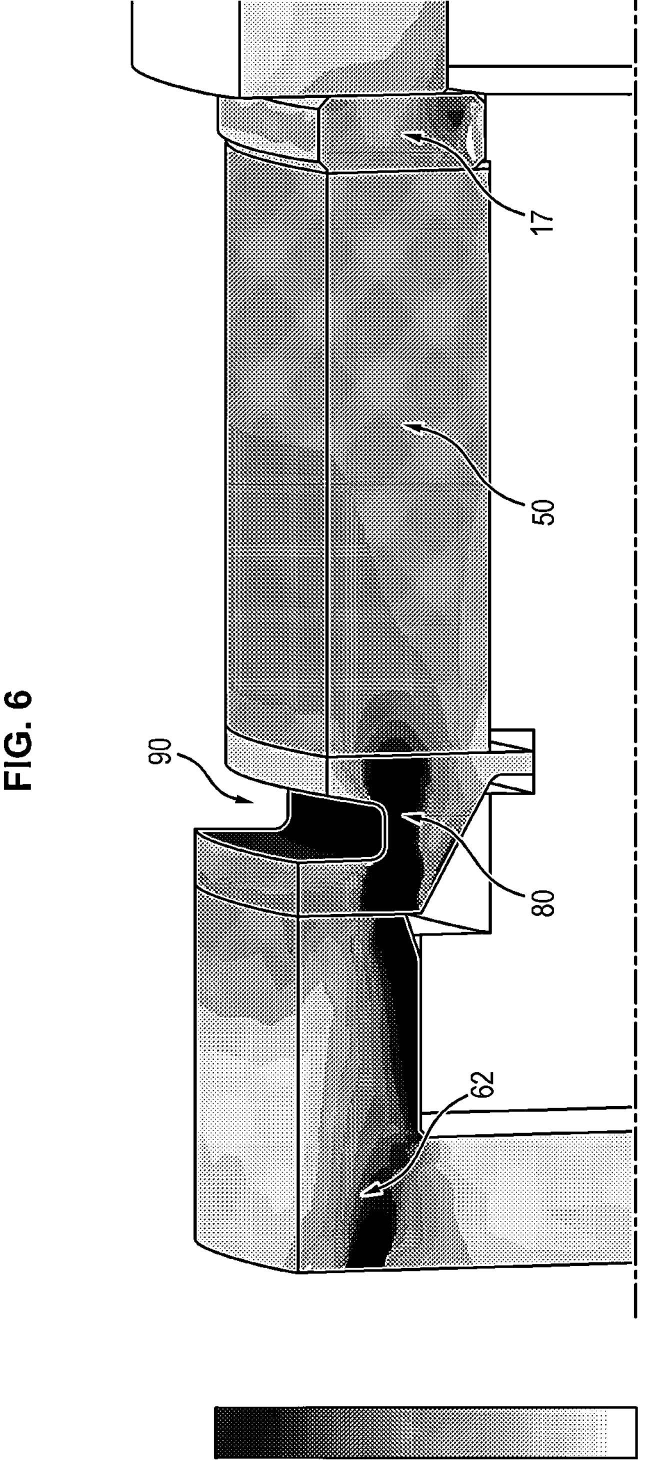
FIGS. 6 and 7 illustrate an installation for digitally simulating the forces in the push rod and the stack of disks of the machine of FIG. 3, and the pressure values observed.
Figure 7:
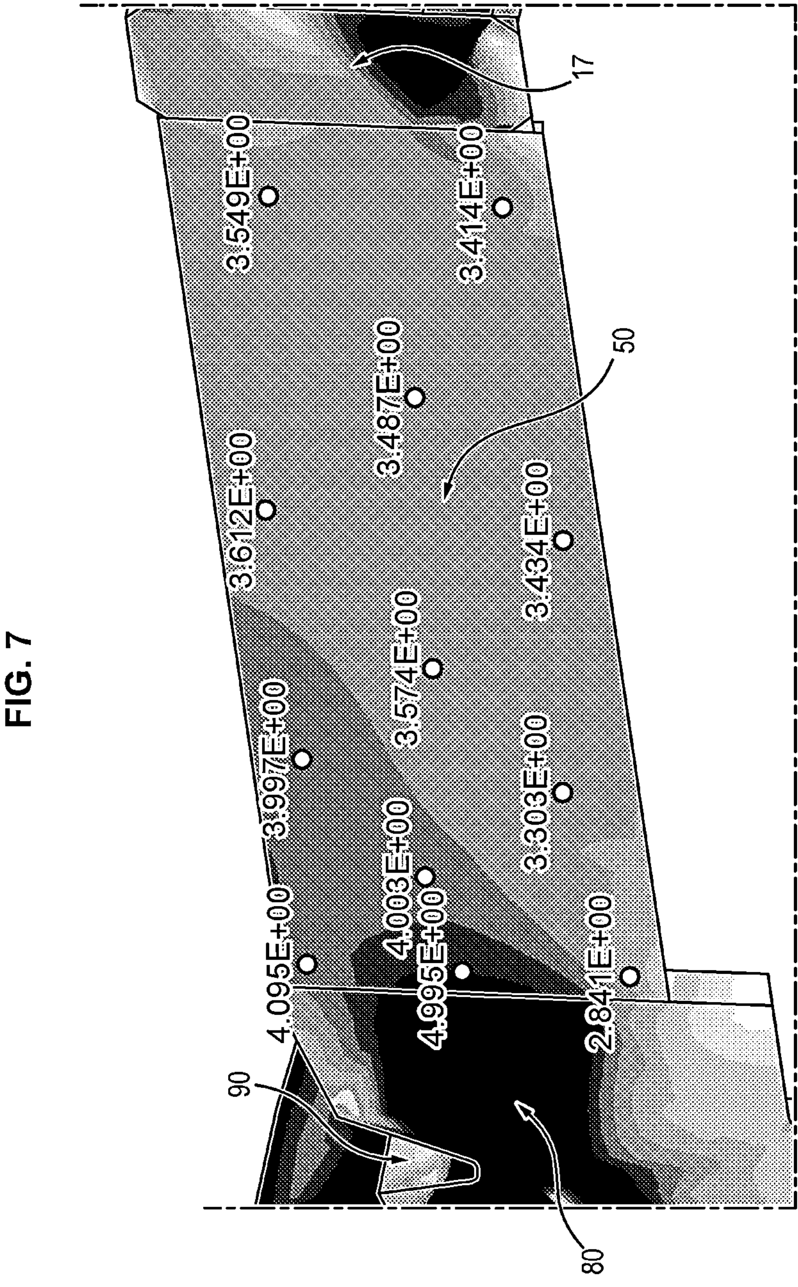

This is shown by FIGS. 6 and 7, which show a digital simulation of the distribution of forces in the machine. In this simulation, only the sheath 62, the push rod 80, the stack 50 which is shown here as a single block and the wedge 17 located on the other side of the stack have been taken into account. Here the push rod 80 has the same configuration as that of FIG. 3, the notch 90 indenting the push rod from its side farthest from the axis.

The two figures illustrate the distribution of forces in the stack of disks. It can be seen that this distribution is good. In fact, the pressure generated at the contact interface between the sheath 62 and the push rod 80 is near 6 MPa. This is the same pressure value that is found in the entire median portion of the push rod 80, particularly at the bottom of the notch 90 and up to the contact interface with the stack 50. On the other hand, inside the stack, the local pressure drops very rapidly when moving away from the push rod, to take on values comprised between 3 and 4 MPa, or even less. In this example, the pressure generated on the side of the sheath therefore drips by 2 MPa once transmitted into the stack. Moreover, the mean pressure measured inside the stack remains relatively constant. A good compromise is therefore achieved between the distribution of contact pressures in the stack of disks, on the one hand, and the mechanical resistance and machining constraints of the push rod on the other hand.

The stack of disks 50 is in a lubrication and cooling bath. The disks are made for example of nitrided steel. They can be equipped with a lining of a friction material, the lining being grooved for example to allow the passage of oil between the disks. The disks can thus include perforations or through grooves for the same reasons.

Of course, it is possible to apply numerous modifications to the invention without departing from its scope.

For example, the stack of disks can serve as a clutch in the rotating machine.

The guiding of the push rod 80 can occur by means of a face of the push rod oriented in the direction opposite to the axis.

The invention claimed is:

1. A hydraulic machine, the hydraulic machine comprising:

- a fixed part,
- a part rotatably mounted about an axis with respect to the fixed part,
- a stack of disks forming a brake or clutch, the disks being configured to be in abutment against one another by way of friction surfaces having a mean friction radius measured from the axis; and
- a push rod configured to push the disks into abutment against one another, in a direction parallel to the axis, over a thrust surface having a mean thrust radius measured from the axis and which extends beyond the mean friction radius, the push rod having a radial annular notch indenting the push rod from a side of the push rod opposite to the axis;

wherein the notch is dimensioned so that the mean friction radius is comprised between a larger radius of the notch and a smaller radius of the notch.

2. The machine according to the preceding claim, wherein the push rod has a radius greater than a larger radius of the friction surfaces.

3. The machine according to claim 1, configured so that at least one part of the push rod bends increasingly as thrust of the push rod against the stack increases.

4. The machine according to claim 1, wherein at least one part of the push rod has an axial dimension which decreases in the direction of a free end of the at least one part of the push rod.

5. The machine according to claim 1 wherein, the notch having two main faces facing one another, one of these faces is inclined oriented in the direction of the exterior of the push rod.

6. The machine according to claim 5 wherein the inclined face extends from one side of the notch closest to the stack.

7. The machine according to claim 1, wherein the push rod has a push rod guide face in the axial direction with respect to a support.

8. The machine according to the preceding claim wherein the guide face extends entirely from one side of the notch farthest away from the stack.

9. The machine according to claim 1, which comprises:

- a spring configured to push the push rod against the stack, and
- a de-braking chamber configured so that hydraulic pressure in the chamber applies a force opposing braking to the spring.

10. The machine according to claim 1, wherein the stack is in an oil bath.

11. The machine according to claim 1, wherein the disks are made of nitrided steel.

12. The machine according to claim 1, wherein the disks comprise a lining of a friction material.

13. The machine according to the preceding claim, wherein the lining has grooves.

14. The machine according to claim 1, wherein the stack forms a brake.

15. A hydraulic machine, the hydraulic machine comprising:

a fixed part, a part rotatably mounted about an axis with respect to the fixed part, a stack of disks forming a brake or clutch, the disks being configured to be in abutment against one another by way of friction surfaces having a mean friction radius measured from the axis; and a push rod configured to push the disks into abutment against one another, in a direction parallel to the axis, over a thrust surface having a mean thrust radius measured from the axis and which extends within the mean friction radius, the push rod having a radial annular notch indenting the push rod from a side of the push rod closest to the axis, wherein the notch is dimensioned so that the mean friction radius is comprised between a larger radius of the notch and a smaller radius of the notch.

* * * * *